Sept. 22, 1953    V. L. FRAZIER    2,653,034
AXLE LOAD EQUALIZING ASSEMBLY
Filed Jan. 15, 1951    2 Sheets-Sheet 1
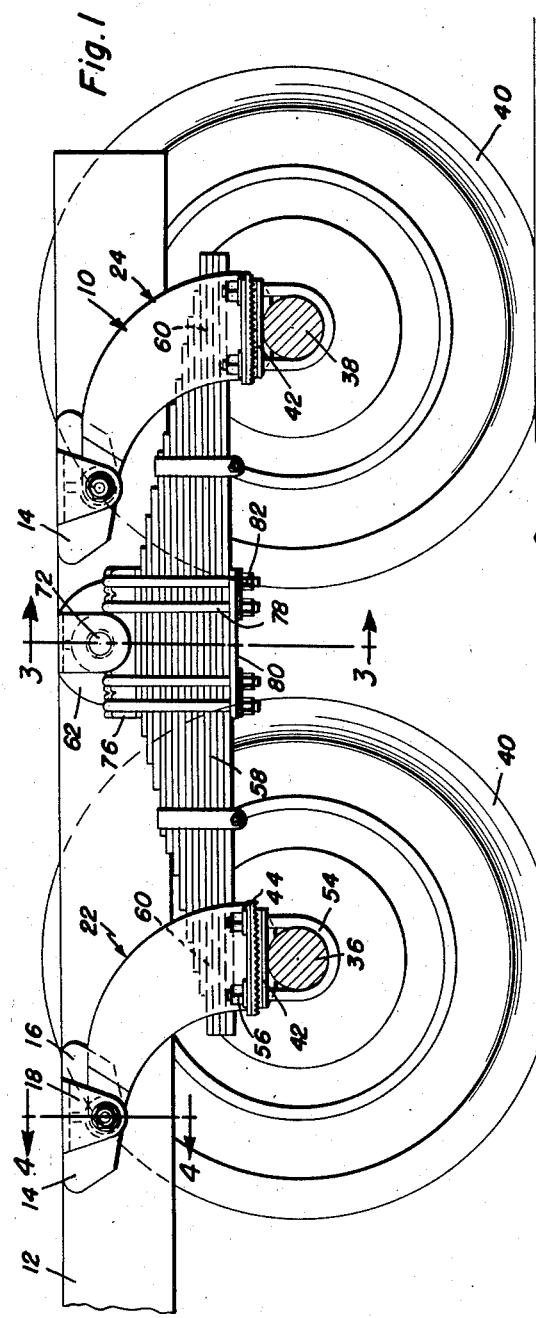
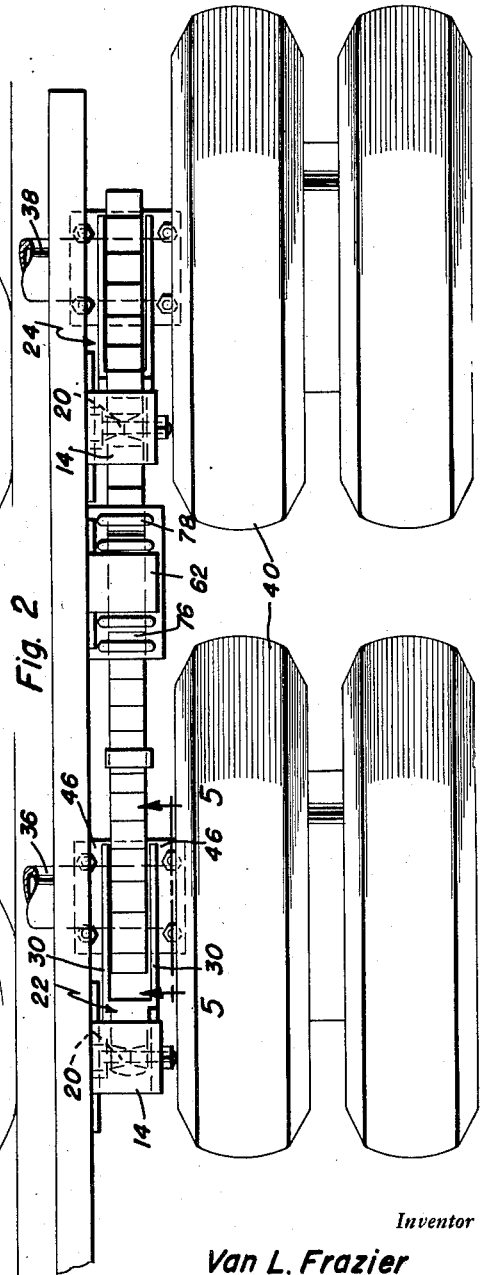
Inventor
Van L. Frazier
By *Clarence A. O'Brien
and Harvey B. Jacobson*
Attorneys

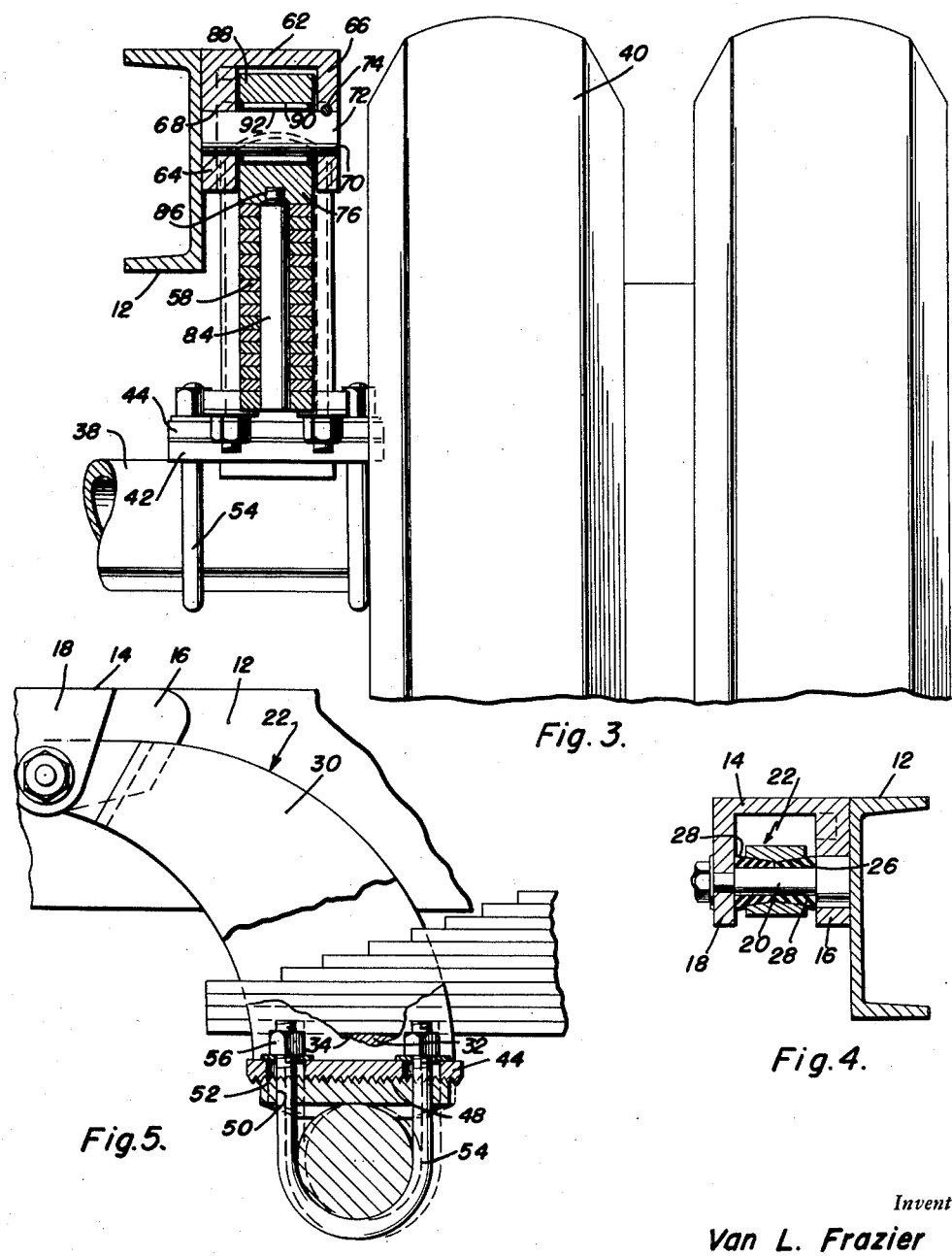

Patented Sept. 22, 1953

2,653,034

UNITED STATES PATENT OFFICE 2,653,034

AXLE LOAD EQUALIZING ASSEMBLY

Van L. Frazier, Springfield, Mo., assignor to Frazier Tandem Systems, Incorporated, Springfield, Mo., a corporation of Missouri Application January 15, 1951, Serial No. 206,048

12 Claims. (Cl. 280—104.5)

1

This invention relates to new and useful improvements in means for resiliently supporting a vehicle frame on a pair of tandem axles and for equalizing the load on such axles.

The primary object of this invention is to equalize axle loads on tandem axles at all times, and particularly when the wheels are being braked in an assembly which utilizes only one spring at each of the sides of the vehicle.

Another important object of this invention is to insure the axles remaining in parallel relation at all times and to afford a convenient means for both mounting the vehicle on the axles and for adjusting the axles into parallel relation.

One of the most important features of the present invention resides in the novel construction of the stabilizer arms, such arms incorporating in their construction spring seats and structure whereby the axle chairs may be adjustably secured to the same.

Still other important features of the present invention reside in the stabilizer arm brackets and the spring mounting bracket, and the means by which the stabilizer arms and the spring are pivotally connected to such brackets respectively.

Other features of merit present in the invention reside in the extreme simplicity of the overall construction, the identity between various parts of the assembly simplifying manufacture and repair problems, and the durability and efficiency of the assembly for the purposes intended.

Other objects and features of the present invention will be appreciated as the following description proceeds, such description being made in conjunction with the accompanying drawings, wherein:

Figure 1 is a side elevational view of the assembly to be provided on the left hand side of the vehicle, and showing such assembly attached to a frame member, partially shown, of a vehicle, certain hidden details of the assembly being shown in dotted outline and with the axles to which the assembly is connected being shown in section;

Figure 2 is a top plan view of the construction shown in Figure 1, certain details that are hidden from view being shown in dotted outline;

Figure 3 is a vertical transverse sectional view taken upon an enlarged scale upon the plane of the section line 3—3 of Figure 1;

Figure 4 is another enlarged vertical sectional view, this view being taken upon the plane of the section line 4—4 of Figure 1; and Figure 5 is still another enlarged sectional detail view, this view being taken upon the plane of the section line 5—5 in Figure 2 and showing portions of the stabilizer arm in dotted outline with other portions being broken away.

Reference is now made more specifically to the accompanying drawings, wherein like numerals designate similar parts throughout the various views, and in which the assembly constituting the subject matter of the present invention is designated generally at 10.

Before proceeding further with the description of the invention, it is to be understood that while only the assembly provided for the left hand side of a vehicle is illustrated in the drawings, a corresponding assembly is to be provided for the right hand side of the vehicle which will be a mirror image of the assembly shown and designated at 10. It should also be stated at this point that only a reversal of some of the parts constituting the assembly 10 is necessary to make the assembly 10 suitable for attachment to the right hand side of a vehicle. The necessary rearrangement of the parts will be explained presently.

Suitably secured at longitudinally spaced positions on a vehicle frame member 12 by any suitable means, such as welding or the like, is a pair of stabilizer arm brackets 14. As clearly shown in Figures 1 and 4, the stabilizer arm brackets 14 are of inverted U-shaped configuration and include spaced side walls 16 and 18, between which side walls 16 and 18 is suitably secured a transversely extending pivot pin 20.

A pair of stabilizer arms 22 and 24 are provided which are identical in construction, each of which stabilizer arms is arcuate in shape and apertured adjacent its upper end as at 26 to receive the pivot pin 20. As will be noted, oppositely tapered resilient bushings 28 are disposed on the pivot pins 20 and seated between the side walls 16 and 18, such bushings 28 extending through the apertures 26 to space the stabilizer arms from the pivot pins 20 so as to silence and reduce wear at these pivotal connections between the stabilizer arms and the stabilizer arm brackets.

As best shown in Figures 1, 2 and 5, the stabilizer arms 22 and 24 extend downwardly and rearwardly from their pivotal connections to the brackets 14, and substantially the entire lower portions of the stabilizer arms are bifurcated to define transversely spaced side walls 30, the lower edges of the transversely spaced side walls 30 being connected by a horizontally disposed web portion 32. The web portions 32 of the stabilizer arms 22 and 24 may be either integrally formed with the side walls 30 or formed separately and securely attached thereto by welding or the like. As best shown in Figure 5, the upper surfaces of the web portions 32 are longitudinally convexed, as at 34, and as will be seen presently such web portions 32 constitute spring seats.

Means is provided for adjustably securing tandem axles 36 and 38 to the lower ends of the stabilizer arms 22 and 24, respectively. Rotatably mounted, by means not shown, on the axles 36 and 38 are ground wheels 40. The means for securing the axles to the stabilizer arms comprises axle chairs 42 disposed on the top of the axles, such axle chairs 42 having their undersides suitably shaped to conform to the configuration of the axles, as will be understood. Horizontally disposed adjustment plates 44 are adjustably seated on the top of the axle chairs 42 and are rigidly secured to the lower ends of the stabilizer arms 22 and 24, it being noted that the plates 44 project laterally from the side walls 30, as at 46 (see Figure 2). The plates 44 may be integrally formed with the web portions 32, as shown, or separately secured to the lower ends of the stabilizer arms by welding or the like. The sides of the axle chairs and the plates that are in engagement are substantially horizontal and flat so that the plates 44 may be shifted forwardly and rearwardly with respect to the axle chairs 42; however, such sides of the plates 44 and the axle chairs 42 are serrated by the provision of complementary sets of longitudinally spaced, transversely extending teeth thereon, as at 48, so that when the plates 44 and the axle chairs 42 are pressed together, forward and rearward relative movement thereof is impossible. In order to clamp the plates 44 and the axle chairs 42 in adjusted relation and to secure the axles to the axle chairs, the axle chairs 42 are provided with spaced pairs of apertures 50, and the laterally extending portions 46 of the plates 44 are provided with longitudinally extending slots 52 in registry with the apertures 50. U-bolts 54 embrace the axles and extend upwardly through the apertures 50 and the slots 52 and have fastening nuts 56 threaded on their upper extremities that bear upon the adjustment plates 44, as clearly shown in Figure 5.

As thus far described, it will be obvious that the nuts 56 may be loosened on the U-bolts 54, and the adjustment plates 44 adjusted relative to the axle chairs 42 with the U-bolts sliding in the slots 52, and that the nuts 56 may then be tightened to secure the adjustment plates 44 and the axle chairs 42 in adjusted relation.

An elongated spring, preferably of the leaf type 58 is provided, the opposite end portions 60 of which extend between the side walls 30 of the stabilizer arms 22 and 24 and rest upon the web portions 32. Means is provided intermediate the ends of the spring 58 for pivotally mounting the spring 58 on the frame member 12, such means comprising an inverted U-shaped bracket 62 suitably secured to the frame member 12 intermediate the brackets 14, as by welding or the like. The bracket 62 includes transversely spaced side walls 64 and 66 (see Figure 3) that are provided with aligned openings 68 and 70, respectively, in which is received a pivot shaft 72. The pivot shaft 72 is removably retained in the bracket 62 by a removable pin 74 in the wall 66 that engages the pivot shaft 72, as will be understood.

An elongated spring rocker arm 76 is secured centrally to the top of the spring 58 by means of U-bolts 78, which U-bolts 78 embrace the arm 76 and the spring 58 and are secured at their lower extremities to a strap 80 that underlies the central portion of the spring 58 by nuts 82. In addition, as shown in Figure 3, a fastening bolt 84 extends upwardly through suitably aligned apertures in the central portion of the spring 58 and has its upper end in threaded engagement with an internally threaded socket formed in the underside of the arm 76 as clearly shown at 86.

An upstanding bearing member 88 is provided centrally of the spring rocker arm 76, such bearing member 88 being provided with a transverse opening 90 which receives the pivot shaft 72. Anti-friction means, such as the needle bearings 92 are interposed between the bearing member 88 and the pivot shaft 72 to afford free pivotal movement of the spring 58 about the pivot shaft 72 as an axis.

As mentioned previously, only a rearrangement of the parts forming the assembly 10 is necessary to render the same suitable for use on the right hand side of a vehicle. It will now be apparent that if the stabilizer arms 22 and 24 are each reversed with respect to the brackets 14 to which they are attached, the entire assembly would be in order for attachment to the right hand side of a vehicle so as to bear the same relation thereto as the left hand assembly shown in Figure 1.

It is thought that the advantages of the present invention will be readily apparent to those skilled in the art. The simplicity of construction and assembly will be evident, as well as the fact that the invention is not limited to any particular vehicle frame width, is easily adjusted, wear resistant, and has a minimum number of working parts. In addition, use of the present invention will serve to equalize the load on the tandem axles and to assure even braking action.

In the light of the drawings and the above description, it will be apparent that the invention will readily lend itself to minor changes and modifications without departing from the spirit of the invention. Therefore, it is desired to be limited only to the scope of the invention as defined in the appended claims.

Having described the invention, what is claimed as new is:

1. An axle load equalizing assembly comprising a longitudinally extending frame member, a pair of parallel transversely extending axles disposed below the frame member, a pair of stabilizer arms having their lower ends secured to the axles, rigid horizontal pivot pins securing the upper ends of said arms at longitudinally spaced positions to the frame member for swinging movement in a longitudinal vertical plane, and a longitudinally extending spring pivotally secured intermediate its ends to the frame member for swinging in said plane and supported adjacent its opposite ends on the lower ends of the stabilizer arms, said arms having registering horizontal openings therein accommodating the ends of the spring, the pivot pins for said arms being disposed above said spring and located in a common plane that extends through the pivot means for the spring.

2. An axle load equalizing assembly comprising a longitudinally extending frame member, a pair of parallel transversely extending axles disposed below the frame member, a pair of stabilizer arms having their lower ends secured to the axles, horizontal rigid pivots securing the upper ends of said arms at longitudinally spaced positions to the frame member for swinging movement in a longitudinal vertical plane, said stabilizer arms extending downwardly and rearwardly in substantially parallel relation and having registering openings therein including flat coplanar bottom walls, and a longitudinally extending spring pivotally secured intermediate its ends to the frame member for swinging in said plane and supported adjacent its opposite ends on the bottom walls of the openings in the stabilizer arms, the pivot means for said arms being disposed above said spring and located in a common plane that extends through the pivot means for the spring.

3. An axle load equalizing assembly comprising a longitudinally extending frame member, a pair of parallel transversely extending axles disposed below the frame member, a pair of bifurcated stabilizer arms pivotally secured to the frame member for swinging movement in a longitudinal vertical plane and each having a web portion at its lower end joining its furcations, means securing the lower ends of the stabilizer arms to the axles, said means including an axle chair on one of the axles, a substantially horizontal adjustment plate fixed to the lower end of one of the stabilizer arms, said plate and said axle chair having complementary serrated surfaces in engagement, said chair having apertures and the plate having longitudinally extending slots registering with the apertures, means securing the axle, the axle chair and the adjustment plate in adjusted relation including a U-bolt embracing the axle and extending through the apertures and the slots, and a longitudinally extending spring pivotally secured to the frame member intermediate its ends for vertical swinging movement and having its ends extending between the furcations of the arms and supported on the web portions of the stabilizer arms.

4. An axle load equalizing assembly comprising a longitudinally extending frame member, a pair of parallel transversely extending axles disposed below the frame member, a pair of bifurcated stabilizer arms having their lower ends secured to the axles, rigid horizontal pivot pins securing the upper ends of said arms at longitudinally spaced positions to the frame member for swinging movement in a longitudinal vertical plane, each of said arms having a web portion at its lower end joining its furcations, a longitudinally extending spring extending between the furcations of the arms and supported adjacent its opposite ends on the web portions of the stabilizer arms, an inverted U-shaped spring mounting bracket secured to the frame member intermediate the upper ends of the stabilizer arms, said mounting bracket including a web portion connecting spaced depending legs, a shaft extending between the legs, a spring rocker arm secured to the top of the spring intermediate the ends of the latter, and an upstanding bearing member on the rocker arm pivotally mounted on the shaft.

5. In an axle load equalizing assembly, a pair of stabilizer arm brackets adapted to be secured at longitudinally spaced positions on a vehicle frame, a pair of bifurcated stabilizer arms pivotally secured at their upper ends to the pair of brackets and having web portions at their lower ends joining their furcations, means carried at the lower ends of the stabilizer arms for securing a pair of axles thereto, a longitudinally extending spring disposed between the furcations of the arms and resting against the web portions of the stabilizer arms, a spring mounting bracket adapted to be secured to a vehicle frame intermediate and spaced horizontally from the pair of brackets, and means for pivotally securing the spring intermediate its ends to the spring mounting bracket and in a horizontal plane common with the pivot means for said arms.

6. In an axle load equalizing assembly, a pair of stabilizer arm brackets adapted to be secured at longitudinally spaced positions on a vehicle frame, a pair of stabilizer arms pivoted at their upper ends to said pair of brackets for vertical swinging movement, said arms extending downwardly and rearwardly and including a pair of transversely spaced side walls connected at their lower ends by a web portion constituting a spring seat, a spring mounting bracket adapted to be secured to a vehicle frame intermediate and spaced horizontally from the pair of brackets, a longitudinally extending spring pivoted intermediate its ends to the mounting bracket for vertical swinging movement, the ends of said spring extending between the side walls of the arms and resting on said web portions, and means for securing axles to the lower ends of the stabilizer arms, the pivot means for said arms lying in a common horizontal plane with the pivot means for said spring.

7. In an axle load equalizing assembly, a pair of stabilizer arm brackets adapted to be secured at longitudinally spaced positions on a vehicle frame, a pair of stabilizer arms, rigid horizontal pivots securing the upper ends of said arms to said pair of brackets for vertical swinging movement, said arms extending downwardly and rearwardly and including a pair of transversely spaced side walls connected at their lower ends by a web portion constituting a spring seat, the upper surfaces of said web portions being longitudinally convexed, a spring mounting bracket adapted to be secured to a vehicle frame intermediate and spaced horizontally from the pair of brackets, a longitudinally extending spring pivoted intermediate its ends to the mounting bracket for vertical swinging movement, the ends of said spring extending between said side walls and resting on said web portions, and means for securing axles to the lower ends of the stabilizer arms, the pivot means for said arms lying in a common horizontal plane with the pivot means for said spring.

8. In an axle load equalizing assembly, a pair of stabilizer arm brackets adapted to be secured at longitudinally spaced positions on a vehicle frame, a pair of stabilizer arms, rigid horizontal pivots securing the upper ends of said arms to said pair of brackets for vertical swinging movement, said arms extending downwardly and rearwardly and including a pair of transversely spaced side walls rigidly connected at their lower ends by a web portion constituting a spring seat, a spring mounting bracket adapted to be secured to a vehicle frame intermediate the pair of brackets, a longitudinally extending spring pivoted intermediate its ends to the mounting bracket for vertical swinging movement, said spring having its ends disposed between the side walls of the arms and resting on said web portions, and means for securing axles to the lower ends of the stabilizer arms, said last means comprising an axle chair, an adjustment plate secured to the lower end of one of said stabilizer arms, said chair and plate having complementary serrated surfaces in engagement, said chair having apertures and the plate having longitudinally extending slots, means for securing the chair and the plate in adjusted relation including a U-bolt extending through the apertures and the slots which is adapted to embrace an axle.

9. In an axle load equalizing assembly, a pair of stabilizer arm brackets adapted to be secured at longitudinally spaced positions on a vehicle frame, a pair of stabilizer arms, rigid horizontal pivots securing the upper ends of said arms to said pair of brackets for vertical swinging movement, said arms extending downwardly and rearwardly and including a pair of transversely spaced side walls connected at their lower ends by a rigid web portion constituting a spring seat, a spring mounting bracket adapted to be secured to a vehicle frame intermediate the pair of brackets, a longitudinally extending spring pivoted intermediate its ends to the mounting bracket for vertical swinging movement, said spring having its ends disposed between said side walls over the web portions and resting on said web portions, and means for securing axles to the lower ends of the stabilizer arms, said last means comprising an axle chair, an adjustment plate secured to the lower end of one of said stabilizer arms, said chair and plate having complementary sides in engagement, such complementary sides being provided with longitudinally spaced rows of transversely extending teeth, said chair and plate having complementary serrated surfaces in engagement, said chair having apertures and the plate having longitudinally extending slots, means for securing the chair and the plate in adjusted relation including a U-bolt extending through the apertures and the slots which is adapted to embrace an axle.

10. An axle load equalizing assembly comprising a longitudinally extending frame, a pair of transversely extending axles disposed below the frame, a pair of rigid stabilizer arms having upper and lower ends, horizontal pivots rigidly securing the upper ends of said arms to said frame for vertical swinging movement, each of said arms having an opening therein between its ends, said openings being in registry with each other, an elongated spring centrally pivotally attached to the frame and having its ends received in said openings, the lower ends of said arms including web portions having flat lower faces and convexed upper surfaces, the ends of said springs resting upon said convexed surfaces, plates engaging the flat lower faces of the web portions and having lower serrated surfaces, axle chairs underlying the plates and having upper serrated surfaces interdigitated with the serrated surfaces of the plates, and U-bolts about the axles and extending through the chairs and plates.

11. The combination of claim 10 and a pair of oppositely tapered resilient bushings on each pivot, the upper ends of said arms having apertures with countersunken ends receiving the bushings.

12. An axle load equalizing assembly comprising a longitudinally extending frame member, a pair of parallel transversely extending axles disposed below the frame member, a pair of stabilizer arms having their upper ends pivotally secured at longitudinally spaced positions to the frame member for swinging movement in a longitudinal vertical plane and said arms having their lower ends secured to the axles, and a longitudinally extending spring pivotally secured intermediate its ends to the frame member for swinging in said plane and having its ends freely slidably engaged with and supported on the lower ends of the arms to permit flexing of the spring without stretching thereof, the pivots for said arms and the pivot for said spring being spaced apart and lying in a common horizontal plane.

VAN L. FRAZIER.

References Cited in the file of this patent

UNITED STATES PATENTS

| Number | Name | Date |
|---|---|---|
| 1,928,860 | Marcum | Oct. 3, 1933 |
| 1,949,830 | Fageol | Mar. 6, 1934 |
| 2,094,083 | Wood | Sept. 28, 1937 |
| 2,245,201 | Kjolseth | June 10, 1941 |
| 2,342,110 | Barber | Feb. 22, 1944 |
| 2,434,304 | Wilson | Jan. 13, 1948 |
| 2,459,372 | Fraunfelder | Jan. 18, 1949 |
| 2,496,713 | Gray | Feb. 7, 1950 |